(12) United States Patent
Wu

(10) Patent No.: US 8,703,292 B2
(45) Date of Patent: Apr. 22, 2014

(54) INTERMEDIATE TRANSFER MEMBERS CONTAINING THERMOPLASTIC MIXTURES

(75) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 202 days.

(21) Appl. No.: 13/177,875

(22) Filed: Jul. 7, 2011

(65) Prior Publication Data

US 2013/0009103 A1  Jan. 10, 2013

(51) Int. Cl.
*H01B 1/12* (2006.01)
*G03G 15/14* (2006.01)

(52) U.S. Cl.
USPC ........................... 428/411.1; 399/121

(58) Field of Classification Search
None
See application file for complete search history.

(56) References Cited

U.S. PATENT DOCUMENTS

| | | | |
|---|---|---|---|
| 5,802,442 A * | 9/1998 | Konno et al. | 399/308 |
| 5,978,639 A | 11/1999 | Masuda et al. | |
| 5,998,010 A * | 12/1999 | Schlueter et al. | 428/323 |
| 6,139,784 A | 10/2000 | Oshima et al. | |
| 6,397,034 B1 | 5/2002 | Tarnawskyj et al. | |
| 7,031,647 B2 | 4/2006 | Mishra et al. | |
| 7,130,569 B2 | 10/2006 | Goodman et al. | |
| 7,139,519 B2 | 11/2006 | Darcy, III et al. | |
| 7,781,133 B2 | 8/2010 | Wu et al. | |
| 2003/0087175 A1 * | 5/2003 | Simpson et al. | 430/126 |
| 2004/0054071 A1 * | 3/2004 | Gobelt et al. | 524/588 |
| 2006/0160939 A1 * | 7/2006 | Starkovich | 524/406 |
| 2007/0282051 A1 * | 12/2007 | Okano | 524/495 |
| 2009/0048379 A1 * | 2/2009 | Weinberg et al. | 524/420 |

OTHER PUBLICATIONS

SciFinder, Polyphenyl Sulfone, retrieved Mar. 15, 2013, p. 1.*
Sigma-Aldrich, Polyphenylsulfone, Catalog, Retrieved May 31, 2013, p. 1.*

* cited by examiner

*Primary Examiner* — Callie Shosho
*Assistant Examiner* — Patrick English
(74) *Attorney, Agent, or Firm* — Eugene O. Palazzo

(57) ABSTRACT

An intermediate transfer member that includes a mixture of a thermoplastic polymer, a zirconium tungstate, an optional polysiloxane, and an optional conductive filler.

19 Claims, 1 Drawing Sheet

INTERMEDIATE TRANSFER MEMBERS CONTAINING THERMOPLASTIC MIXTURES

This disclosure is generally directed to thermoplastic containing intermediate transfer members, and to an intermediate transfer member that includes a mixture of a thermoplastic polymer, a zirconium tungstate, an optional polysiloxane, and an optional conductive component.

BACKGROUND

Intermediate transfer belts selected for transferring a developed image to paper in xerographic systems are known. A disadvantage relating to the preparation of these known intermediate transfer members is that there is usually required a separate release layer that is present on a metal substrate. Thereafter, there is applied to the release layer the intermediate transfer member components, and where the release layer allows the components to be separated from the substrate by peeling or by the use of mechanical devices. The resulting intermediate transfer member can be in the form of a film, which can be selected for xerographic imaging systems, or the film can be deposited on a supporting substrate like a polymer layer. The use of a release layer adds to the cost and time of preparation, and such a layer can modify a number of the intermediate transfer member characteristics.

High end xerographic machines and printers that generate at least 30 pages per minute and up to 100 pages per minute, or more usually select thermosetting polyimide containing intermediate transfer members. Thermosetting polyimides are primarily selected because of their acceptable modulus of about 3,500 Mega Pascals, and their low thermal expansion coefficients of about 20 to about 50 ppm/° K. However, intermediate transfer members using these materials are uneconomical in that both the raw material cost and the manufacturing process cost are higher than when using a number of other known materials.

There is a need for intermediate transfer members that substantially avoid or minimize the disadvantages of a number of known intermediate transfer members.

Further, there is a need for intermediate transfer members possessing a low coefficient of thermal expansion (CTE) comparable to thermosetting polymer containing intermediate transfer members, acceptable break strength, high modulus, and excellent release characteristics.

There is also a need for thermoplastic containing intermediate transfer member materials that possess self release characteristics from a number of substrates that are selected when such members are prepared.

Additionally, there is a need for an economical thermoplastic polymer containing intermediate transfer member where the surface of the member is smooth with minimal rugged peaks and valleys.

Yet another need resides in providing intermediate transfer members containing thermoplastics that can be cured at low curing temperatures, such as from about 80° C. to about 200° C. in minimum curing times of, for example, from about 30 to about 120 minutes.

Moreover, there is a need for intermediate transfer members with excellent wear and acceptable abrasion resistance, and which members possess improved stability with no or minimal degradation for extended time periods.

Another need relates to intermediate transfer members that have excellent conductivity or resistivity, and that possess acceptable humidity insensitivity characteristics leading to developed images with minimal resolution issues.

These and other needs are achievable in embodiments with the intermediate transfer members and components thereof disclosed herein.

SUMMARY

Disclosed is an intermediate transfer member comprising a thermoplastic polymer and a zirconium tungstate.

Further disclosed is an intermediate transfer member comprising a mixture of a thermoplastic polymer, a zirconium tungstate, a conductive filler, and a polysiloxane.

Additionally, disclosed is an intermediate transfer member comprising a mixture of a thermoplastic polymer, a zirconium tungstate, a conductive filler, and a polysiloxane, and which member possesses a coefficient of thermal expansion of from about 60 to about 95 ppm/° K.

FIGURES

The following Figures are provided to further illustrate the intermediate transfer members disclosed herein.

EMBODIMENTS

There is provided herein an intermediate transfer member comprising a thermoplastic polymer or resin, a zirconium tungstate, an optional polysiloxane, and an optional conductive component or filler. The mixture of a thermoplastic polymer or resin, and a zirconium tungstate provides excellent coefficient of thermal expansion characteristics, and enables or assists in enabling self release from substrates, such as stainless steel, thereby avoiding the need for a separate release layer on the substrate.

More particularly, there is provided herein an intermediate transfer member comprising a mixture of a thermoplastic resin, such as a polyphenylsulfone, a zirconium tungstate, a polysiloxane, and a conductive filler like carbon black.

Figure 1:
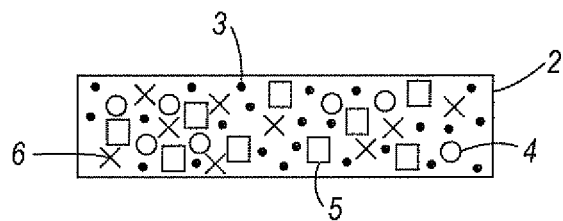
FIG. 1 illustrates an exemplary embodiment of a one layer intermediate transfer member of the present disclosure.

In FIG. 1 there is illustrated an intermediate transfer member comprising a layer 2 comprised of a zirconium tungstate 3, a thermoplastic polymer 4, an optional siloxane polymer 5, and an optional conductive component 6.

Figure 2:
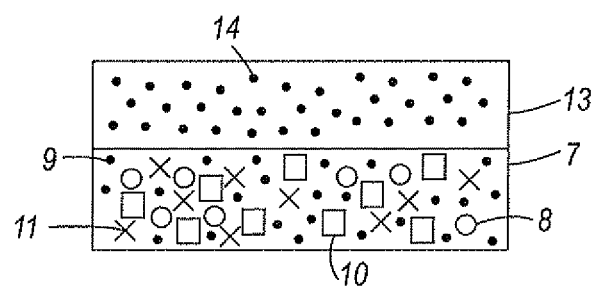
FIG. 2 illustrates an exemplary embodiment of a two layer intermediate transfer member of the present disclosure.

In FIG. 2 there is illustrated a two-layer intermediate transfer member comprising a bottom layer 7 comprising a mixture of a thermoplastic polymer 8, a zirconium tungstate 9, an optional siloxane polymer 10, and an optional conductive component 11, and an optional top or outer toner release layer 13 comprising release components 14.

Figure 3:
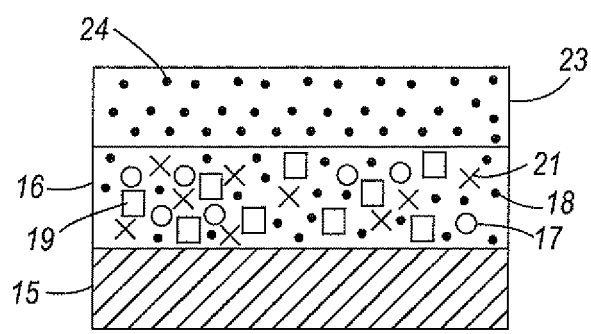
FIG. 3 illustrates an exemplary embodiment of a three layer intermediate transfer member of the present disclosure.

In FIG. 3 there is illustrated a three layer intermediate transfer member comprising a supporting substrate 15, a layer thereover 16 comprising a mixture of a thermoplastic polymer 17, a zirconium tungstate 18, an optional siloxane polymer 19, and an optional conductive component 21, and an optional release layer 23 comprising release components 24.

There is disclosed a self-releasing intermediate transfer member mixture that comprises a thermoplastic polymer, a zirconium tungstate, a polysiloxane, and a conductive component with excellent coefficient of thermal expansion as determined by Dynamic Mechanical Analysis of, for example, from about 40 to about 95, from about 60 to about 95, from about 50 to about 85, from about 45 to about 80, from about 30 to about 80, from about 40 to about 70, from about 80 to about 90, from about 50 to about 70, from about 75 to about 95, from about 60 to about 91, or from about 75 to about 85 ppm/° K (parts per million per degree Kelvin), excellent stability characteristics, smooth high quality surfaces, and desirable mechanical strength properties.

The intermediate transfer member mixtures disclosed herein exhibit self-release characteristics, and where the use of an external release layer present on, for example, a stainless steel substrate is avoided; permit the complete transfer of from about 90 to about 99 percent, or from about 95 to about 100 percent, of a xerographic developed image to a document like paper; possess a Young's modulus of, for example, from about 3,000 to about 7,000 Mega Pascals (MPa), from about 3,600 to about 6,000 Mega Pascals, from about 3,600 to about 3,700 Mega Pascals, from about 3,500 to about 5,000 Mega Pascals, or from about 3,700 to about 4,000 Mega Pascals; a break strength of from about 75 to about 90 Mega Pascals, from about 80 to about 90 Mega Pascals, or from about 80 to about 85 Mega Pascals, and have an excellent resistivity as measured with a known High Resistivity Meter of, for example, from about $10^8$ to about $10^{13}$ ohm/square, from about $10^9$ to about $10^{13}$ ohm/square, from about $10^9$ to about $10^{12}$ ohm/square, from about $10^{10}$ to about $10^{12}$ ohm/square, or from about $2\times10^9$ to about $4\times10^9$ ohm/square.

Self-release characteristics without the assistance of any external sources, such as prying devices, permit the efficient, economical formation and full separation, such as from about 95 to about 100 percent, or from about 97 to about 99 percent, of the disclosed intermediate transfer member mixtures and films thereof from substrates, such as steel, upon which the members are initially prepared, and where release materials and separate release layers can be avoided on the metal substrates. The time period to obtain the self-release characteristics illustrated herein varies depending, for example, on the components selected for the intermediate transfer mixtures disclosed. Generally, however, this time period is from about 1 to about 60 seconds, from about 1 to about 35 seconds, from about 1 to about 10 seconds, or from 1 to about 5 seconds, and in some instances less than about 1 second.

The intermediate transfer members of the present disclosure can be provided in any of a variety of configurations, such as a one-layer configuration, or in a multi-layer configuration including, for example, a top release layer and/or a supporting substrate. More specifically, the final intermediate transfer member may be in the form of an endless flexible belt, a web, a flexible drum or roller, a rigid roller or cylinder, a sheet, a drelt (a cross between a drum and a belt), a seamless belt that is with an absence of any seams or visible joints in the members, and the like.

Thermoplastic Polymers

The intermediate transfer members herein comprise a polymer layer comprising a thermoplastic polymer with a zirconium tungstate mixed or dispersed therein. Any suitable thermoplastic polymer can be used in embodiments, and can be used alone, in mixtures of two or more, or in mixture with other polymeric binder materials.

Examples of suitable thermoplastic polymers selected for the intermediate transfer mixtures disclosed herein include polyphenylsulfones (PPSU), polysulfones, polyethersulfones, polyesters, polycarbonates, a poly(phenylene sulfide) (PPS), polyamides, and the like, and mixtures thereof.

Thermoplastic examples selected for the disclosed intermediate transfer member mixtures include polyphenylsulfones available from Solvay Chemicals as RADEL® R-5000NT, and RADEL® 5900NT, and which are believed to be of the following formulas/structures

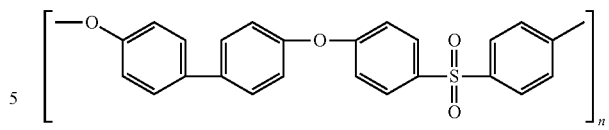

wherein n represents the number of repeating segments, and more specifically, where n is from about 30 to 5,000, from about 50 to 4,000, from about 200 to about 2,000, or from about 80 to 3,500, and with a glass transition temperature of from about 200 to about 250° C., from about 200 to about 235° C., or about 220° C.

Polysulfones and polyethersulfones selected for the disclosed intermediate transfer member mixtures are represented in embodiments by, for example, the following formulas/structures

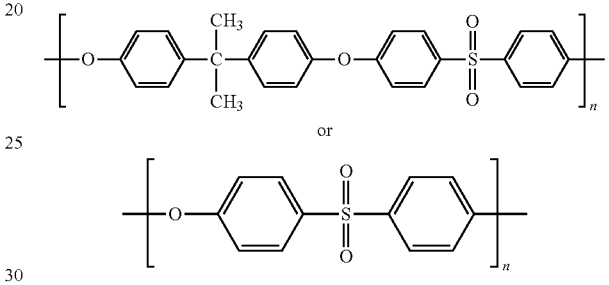

where n represents the number of repeating units, and more specifically, where n is for example, a number of from about 30 to about 5,000, from about 80 to about 3,500, from about 150 to about 3,000, or from about 200 to about 2,000.

Commercially obtainable polysulfone examples selected for the disclosed mixtures include UDEL® P-1700, P-3500, and commercially obtainable polyethersulfone examples include RADEL® A-200A, AG-210NT, AG-320NT, VERADEL® 3000P, 3100P, 3200P, all available or obtainable from Solvay Advanced Polymers, LLC, Alpharetta, Ga.

The number average molecular weight of each of the polysulfones, the polyphenylsulfones and the polyethersulfones in embodiments is, for example, from about 2,000 to about 50,000, or from about 4,000 to about 20,000, and the weight average molecular weight of the polysulfones, the polyphenylsulfones, and the polyethersulfones in embodiments is, for example, from about 10,000 to about 200,000, or from about 50,000 to about 150,000 as determined by known methods such as GPC analysis.

Examples of thermoplastic polyester polymers that can be selected for the disclosed mixtures include known aliphatic polyesters available from E.I. DuPont, such as polyglycolic acids, polylactic acids, and polycaprolactones; aliphatic copolyesters such as polyethylene adipates and polyhydroxyalkanoates; aromatic copolyesters such as polyethylene terephthalates (PET), polybutylene terephthalates (PBT), polytrimethylene terephthalates (PTT), polyethylene naphthalates (PEN), and VECTRAN®.

Thermoplastic polycarbonate polymer examples that can be selected for the disclosed mixtures include poly(4,4'-isopropylidene-diphenylene)carbonate (also referred to as bisphenol-A-polycarbonate), poly(4,4'-cyclohexylidine diphenylene)carbonate (also referred to as bisphenol-Z-polycarbonate), poly(4,4'-isopropylidene-3,3'-dimethyl-diphenyl)carbonate (also referred to as bisphenol-C-polycarbonate), and the like. In embodiments, the thermoplastic polymers are comprised of bisphenol-A-polycarbonate resins, commercially available as MAKROLON® with, for example, a weight average molecular weight of from about 50,000 to about 500,000, or from about 225,000 to about 425,000.

Examples of thermoplastic poly(phenylene sulfide) polymers that can be selected for the disclosed mixtures include RYTON® poly(phenylene sulfide) available from Chevron Phillips as a crosslinked polymer; FORTRON® poly(phenylene sulfide) available from Ticona Incorporated as a linear polymer; and SULFAR® poly(phenylene sulfide) available from Testori Incorporated.

Thermoplastic polyamide polymers that can be selected for the disclosed polymer include aliphatic polyamides such as Nylon 6 and Nylon 66 from DuPont; semi aromatic polyamides, or polyphthalamides such as TROGAMID® 6T from Evonik Industries; and aromatic polyamides, or aramides such as KEVLAR® and NOMEX® available from E. I. DuPont, and TEIJINCONEX®, TWARON® and TECHNORA® available from Teijin Incorporated.

The thermoplastic polymer used in the polymer layer mixture can be present in any suitable or desired amount. For example, the thermoplastic polymer can be present, for example, in an amount of from about 35 weight percent to about 95 weight percent, from about 50 to about 95 weight percent, from about 70 to about 95 weight percent, from about 70 to about 90 weight percent, from about 45 weight percent to about 80 weight percent, or from about 55 weight percent to about 70 weight percent, based on the total of the components or solid ingredients present.

Zirconium Tungstate

The intermediate transfer members herein also comprise a zirconium tungstate, such as mixed or dispersed in the thermoplastic polymer layer. The zirconium tungstate generally has a negative coefficient of thermal expansion, which thus helps to lower the coefficient of thermal expansion of the entire intermediate transfer member.

Zirconium tungstate ($Zr_zW_xO_y$), where x is a number of from about 1 to about 4, or from about 2 to about 3, y is a number of from about 6 to about 10, or from about 7 to about 9, and z is a number of from about 0.5 to about 1.5, or from about 1 to about 1.5, is considered a specific type of a metal oxide with some unusual properties. The phase formed at ambient pressure by the reaction of $ZrO_2$ and $WO_3$ can be considered a metastable cubic phase, which has negative thermal expansion characteristics, and which shrinks over a wide range of temperatures when heated. In contrast to most other ceramics exhibiting negative coefficients of thermal expansion, the coefficient of thermal expansion of $ZrW_2O_8$ is isotropic with a high negative magnitude average coefficient of thermal expansion of, for example, about 7.2 ppm/$K^{-1}$ over a wide range of temperatures of, for example, from about 273 to about 777° C.

Although not particularly limited, specific examples of suitable zirconium tungstates that can be selected include $ZrW_2O_8$, $Zr_{0.9}W_2O_{7.8}$, $Zr_{0.8}W_2O_{7.6}$, $Zr_{1.1}W_2O_{8.2}$, $Zr_{1.2}W_2O_{8.4}$, and the like.

Nano sized, such as with an average particle diameter size of from about 100 to about 300 nanometers, from about 150 to about 250 nanometers, or from about 175 to about 200 nanometers as measured by, for example, an electron microscope, zirconium tungstates that can be selected for the intermediate transfer mixtures disclosed herein, are commercially available from a number of companies such as Lorad Chemical Corp., American Elements, and various Chinese vendors.

The zirconium tungstate can be present in the thermoplastic mixture in various effective amounts, such as for example, from about 1 to about 50 weight percent, from about 1 to about 40 weight percent, from about 1 to about 25 weight percent, from about 5 to about 30 weight percent, from about 5 to about 25 weight percent, from about 5 to about 15 weight percent, from about 1 to about 14 weight percent, from about 1 to about 5 weight percent, from about 4 to about 13 weight percent, or from about 10 to about 15 weight percent, based on the total of the components, or solid ingredients present in the disclosed mixtures.

Optional Polysiloxane Polymers

The intermediate transfer member mixture can also include an optional polysiloxane polymer. Examples of polysiloxane polymers selected for the disclosed intermediate transfer member mixture include known suitable polysiloxanes, such as a polyether modified (copolymer) polydimethylsiloxane, commercially available from BYK Chemical as BYK®333, BYK®330 (about 51 weight percent in methoxypropylacetate), and BYK®344 (about 52.3 weight percent in xylene/isobutanol, ratio of 80/20); BYK®-SILCLEAN 3710 and BYK® 3720 (about 25 weight percent in methoxypropanol); a polyester modified polydimethylsiloxane, commercially available from BYK Chemical as BYK® 310 (about 25 weight percent in xylene) and BYK®370 (about 25 weight percent in xylenelalkylbenzenes/cyclohexanone/monophenylglycol, ratio of 75/11/7/7); a polyacrylate modified polydimethylsiloxane, commercially available from BYK Chemical as BYK®-SILCLEAN 3700 (about 25 weight percent in methoxypropylacetate); a polyester polyether modified polydimethylsiloxane, commercially available from BYK Chemical as BYK® 375 (about 25 weight percent in di-propylene glycol monomethyl ether); and the like, and mixtures thereof.

The polysiloxane polymer, or copolymers thereof can be present in the disclosed thermoplastic intermediate transfer mixture in various effective amounts, such as for example, from about 0.01 to about 1 weight percent, from about 0.05 to about 1 weight percent, from about 0.05 to about 0.5 weight percent, from about 0.1 to about 0.3 weight percent, from about 0.1 to about 0.2 weight percent, or from about 0.2 to about 5 weight percent based on the total of the components, or solid ingredients present in the disclosed mixtures.

Optional Fillers

Optionally, the intermediate transfer mixture may contain one or more fillers to, for example, alter and adjust the conductivity of the intermediate transfer member. When the intermediate transfer member is a one layer structure, the conductive filler can be included in the thermoplastic mixture. However, where the intermediate transfer member is a multi-layer structure, the conductive filler can be included in one or more layers of the member, such as in the thermoplastic mixture, the supporting substrate, or in both the supporting substrate and the thermoplastic mixture layer.

Any suitable filler can be used that provides the desired results. For example, suitable fillers include carbon blacks, metal oxides, polyanilines, other known fillers, and mixtures of fillers.

Examples of carbon black fillers that can be selected for the intermediate transfer member mixtures, and where the particle sizes can be determined by an electron microscope and the B.E.T. surface areas can be determined by the standard known one point nitrogen gas physisorption method, that can be selected for the intermediate transfer member mixtures illustrated herein, include special black 4 (B.E.T. surface area=180 $m^2$/g, DBP absorption=1.8 ml/g, primary particle diameter=25 nanometers) available from Evonik-Degussa, special black 5 (B.E.T. surface area=240 $m^2$/g, DBP absorption=1.41 ml/g, primary particle diameter=20 nanometers), color black FW1 (B.E.T. surface area=320 $m^2$/g, DBP absorption=2.89 ml/g, primary particle diameter=13 nanometers), color black FW2 (B.E.T. surface area=460 m$^2$/g, DBP absorption=4.82 ml/g, primary particle diameter=13 nanometers), color black FW200 (B.E.T. surface area=460 m$^2$/g, DBP absorption=4.6 ml/g, primary particle diameter=13 nanometers), all available from Evonik-Degussa; VULCAN® carbon blacks, REGAL® carbon blacks, MONARCH® carbon blacks, and BLACK PEARLS® carbon blacks available from Cabot Corporation. Specific examples of conductive carbon blacks are BLACK PEARLS® 1000 (B.E.T. surface area=343 m$^2$/g, DBP absorption=1.05 ml/g), BLACK PEARLS® 880 (B.E.T. surface area=240 m$^2$/g, DBP absorption=1.06 ml/g), BLACK PEARLS® 800 (B.E.T. surface area=230 m$^2$/g, DBP absorption=0.68 ml/g), BLACK PEARLS® L (B.E.T. surface area=138 m$^2$/g, DBP absorption=0.61 ml/g), BLACK PEARLS® 570 (B.E.T. surface area=110 m$^2$/g, DBP absorption=1.14 ml/g), BLACK PEARLS® 170 (B.E.T. surface area=35 m$^2$/g, DBP absorption=1.22 ml/g), VULCAN® XC72 (B.E.T. surface area=254 m$^2$/g, DBP absorption=1.76 ml/g), VULCAN® XC72R (fluffy form of VULCAN® XC72), VULCAN® XC605, VULCAN® XC305, REGAL® 660 (B.E.T. surface area=112 m$^2$/g, DBP absorption=0.59 ml/g), REGAL® 400 (B.E.T. surface area=96 m$^2$/g, DBP absorption=0.69 ml/g), REGAL® 330 (B.E.T. surface area=94 m$^2$/g, DBP absorption=0.71 ml/g), MONARCH® 880 (B.E.T. surface area=220 m$^2$/g, DBP absorption=1.05 ml/g, primary particle diameter=16 nanometers), and MONARCH® 1000 (B.E.T. surface area=343 m$^2$/g, DBP absorption=1.05 ml/g, primary particle diameter=16 nanometers); and Channel carbon blacks available from Evonik-Degussa. Other known suitable carbon blacks not specifically disclosed herein may be selected as the filler or conductive component for the intermediate transfer member mixtures disclosed herein.

Examples of polyaniline fillers that can be selected for incorporation into the intermediate transfer member mixtures are PANIPOL™ F, commercially available from Panipol Oy, Finland, and known lignosulfonic acid grafted polyanilines. These polyanilines usually have a relatively small particle size diameter of, for example, from about 0.5 to about 5 microns; from about 1.1 to about 2.3 microns; or from about 1.5 to about 1.9 microns.

Metal oxide fillers that can be selected for the disclosed intermediate transfer members include, for example, tin oxide, antimony doped tin oxide, indium oxide, indium tin oxide, zinc oxide, and titanium oxide, and the like.

When present, the filler can be selected in an amount of, for example, from about 1 to about 60 weight percent, from about 1 to about 40 weight percent, from about 3 to about 40 weight percent, from about 4 to about 30 weight percent, from about 3 to about 30 weight percent, from about 10 to about 30 percent, or from about 5 to about 20 weight percent, based on the total of the components, or solid ingredients present in the disclosed mixtures.

Optional Additional Polymers

In embodiments of the present disclosure, the intermediate transfer member mixture can further include an optional polymer that primarily functions as a binder. Examples of suitable known additional polymers include a polyamideimide, a polyimide, a polyetherimide, a poly(vinylidene fluoride), a polyethylene-co-polytetrafluoroethylene, and the like, and mixtures thereof.

When an additional polymer is selected, it can be included in the intermediate transfer member mixture in any desirable and effective amounts. For example, the additional polymer can be present in an amount of from about 1 to about 55 weight percent, from about 1 to about 45 weight percent, from about 1 to about 10 weight percent, or from about 3 to about 12 weight percent, based on the total of the components, or solid ingredients present in the disclosed mixtures.

Optional Supporting Substrates

When desired, a supporting substrate can be included as part of the intermediate transfer member to provide increased rigidity or strength to the intermediate transfer member, and where the supporting substrate is located beneath the disclosed thermoplastic containing mixture layer. The disclosed thermoplastic containing coating mixture dispersion can be formed on any suitable supporting substrate material after being self-released from, for example, a stainless steel substrate. Exemplary supporting substrates include polyimides, polyamideimides, polyetherimides, and the like, and mixtures thereof.

More specifically, examples of the intermediate transfer member supporting substrates are polyimides inclusive of known low temperature, and rapidly cured polyimide polymers, such as VTEC™ PI 1388, 080-051, 851, 302, 203, 201, and PETI-5, all available from Richard Blaine International, Incorporated, Reading, Pa., polyamideimides, polyetherimides, and the like The thermosetting polyimides can be cured at temperatures of from about 180° C. to about 260° C. over a short period of time, such as from about 10 to about 120 minutes, or from about 20 to about 60 minutes, and generally have a number average molecular weight of from about 5,000 to about 500,000 or from about 10,000 to about 100,000, and a weight average molecular weight of from about 50,000 to about 5,000,000 or from about 100,000 to about 1,000,000. Also, for the supporting substrate there can be selected thermosetting polyimides that can be cured at temperatures of above 300° C., such as PYRE M.L.® RC-5019, RC-5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

Examples of polyamideimides that can be selected as supporting substrates for the intermediate transfer members disclosed herein are VYLOMAX® HR-11NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15, $T_g$=255° C., and $M_w$=8,000), HR-13NX (30 weight percent solution in N-methylpyrrolidone/xylene=67/33, $T_g$=280° C., and $M_w$=10,000), HR-15ET (25 weight percent solution in ethanol/toluene=50/50, $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON® AI-10 ($T_g$=272° C.), commercially available from Solvay Advanced Polymers, LLC, Alpharetta, Ga.

Examples of specific polyetherimide supporting substrates that can be selected for the intermediate transfer members disclosed herein are ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

Once formed, the supporting substrate can have any desired and suitable thickness. For example, the supporting substrate can have a thickness of from about 10 to about 300 microns, such as from about 50 to about 150 microns, from about 75 to about 125 microns, or from about 80 to about 100 microns.

Optional Release Layer

If desired, an optional release layer can be further included in the intermediate transfer member, such as over the thermoplastic containing mixtures illustrated herein. The release layer material can assist in providing toner cleaning, and additional effective developed image transfer efficiency from a photoconductor to the intermediate transfer member.

When selected, the release layer can have any desired and suitable thickness. For example, the release layer can have a thickness of from about 1 to about 100 microns, about 10 to about 75 microns, from about 20 to about 50 microns, or from 1 to about 5 microns.

The optional release layer material can comprise TEFLON®-like materials including fluorinated ethylene propylene copolymer (FEP), polytetrafluoroethylene (PTFE), polyfluoroalkoxy polytetrafluoroethylene (PFA TEFLON®), and other TEFLON®-like materials; silicone materials, such as fluorosilicones, and silicone rubbers, such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture, with a molecular weight $M_w$ of approximately 3,500); and fluoroelastomers, such as those sold as VITON®, such as copolymers and terpolymers of vinylidenefluoride, hexafluoropropylene, and tetrafluoroethylene, which are known commercially under various designations as VITON VITON E®, VITON E60C®, VITON E45®, VITON E430®, VITON B910®, VITON VITON B50®, and VITON GF®. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITONA®; (2) a class of terpolymers of vinylidenefluoride, hexafluoropropylene, and tetrafluoroethylene, known commercially as VITON B®; and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomers can be those available from E.I. DuPont de Nemours, Inc. such as 4-bromoperfluorobutene-1,1,1-dihydro-4-bromoperfluorobutene-1, 3-bromoperfluoropropene-1,1,1-dihydro-3-bromoperfluoropropene-1, or any other suitable, known, commercially available cure site monomers.

Intermediate Transfer Member Formation

The intermediate transfer members illustrated herein can be prepared, for example, by known milling processes, and where uniform dispersions of the intermediate transfer member mixtures can be obtained, and then coated on individual metal substrates, such as a stainless steel substrate or the like, using known draw bar coating processes, melt extrusion, blow molding or flow coating methods. The resulting individual film or films can be dried at high temperatures, such as by heating the films at from about 100° C. to about 300° C., or from about 160° C. to about 220° C., for a suitable period of time, such as from about 20 to about 180 minutes, or from about 40 to about 120 minutes, while remaining on the substrates. After drying and cooling to room temperature, from about 23° C. to about 25° C., the films self release from the steel substrates, that is the films release without any external assistance. The resultant intermediate transfer film product can have a thickness of, for example, from about 1 to about 200 microns, from about 15 to about 150 microns, from about 20 to about 100 microns, or from about 25 to about 80 microns.

As metal substrates selected for the deposition of the thermoplastic containing mixtures disclosed herein, there can be selected stainless steel, aluminum, nickel, copper, and their alloys, glass plates, and other conventional typical known materials.

Examples of solvents selected for formation of the intermediate transfer member mixtures and the resulting films thereof, which solvents can be selected in an amount of, for example, from about 60 to about 95 weight percent, or from about 70 to about 90 weight percent of the total mixture components weight include alkylene halides, such as methylene chloride, tetrahydrofuran, toluene, monochlorobenzene, N-methyl-2-pyrrolidone (NMP), N,N-dimethylformamide, N,N-dimethylacetamide, methyl ethyl ketone, dimethylsulfoxide (DMSO), methyl isobutyl ketone, formamide, acetone, ethyl acetate, cyclohexanone, acetanilide, mixtures thereof, and the like. Diluents can be mixed with the solvents selected for the intermediate transfer member mixtures. Examples of diluents added to the solvents in amounts of from about 1 to about 25 weight percent, and from 1 to about 10 weight percent, based on the weight of the solvent and the diluent are known diluents like aromatic hydrocarbons, ethyl acetate, acetone, cyclohexanone and acetanilide.

The intermediate transfer members illustrated herein can be selected for a number of printing and copying systems, inclusive of xerographic printing systems. For example, the disclosed intermediate transfer members can be incorporated into a multi-imaging xerographic machine where each developed toner image to be transferred is formed on the imaging or photoconductive drum at an image forming station, and where each of these images is then developed at a developing station, and transferred to the intermediate transfer member. The images may be formed on a photoconductor and developed sequentially, and then transferred to the intermediate transfer member. In an alternative method, each image may be formed on the photoconductor or photoreceptor drum, developed, and then transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

Specific embodiments will now be described in detail. These examples are intended to be illustrative, and are not limited to the materials, conditions, or process parameters set forth in these embodiments. All parts are percentages by weight of total solids of all the components unless otherwise indicated. The viscosity values were determined by a viscometer.

COMPARATIVE EXAMPLE 1

A coating composition comprising a polyphenylsulfone (PPSU) (RADEL® R-5000NT), available from Solvay Chemicals, special carbon black 4, obtained from Degussa Chemicals, and the polysiloxane copolymer (BYK® 333) with a weight ratio of 85/14.8/0.2 in N-methyl-2-pyrrolidone (about 20 weight percent solids) was prepared by ball milling.

The obtained intermediate transfer member dispersion was coated on a stainless steel substrate of a thickness of 0.5 millimeter, and subsequently, the mixture was cured by heating at 135° C. for 30 minutes, and 200° C. for 40 minutes. The resulting intermediate transfer member, about 80 microns in thickness, comprised of the above components in the ratios indicated did not self release from the stainless steel substrate, but rather adhered to this substrate. After being immersed in water for about three days, the intermediate transfer member obtained eventually self released from the substrate.

EXAMPLE I

There was prepared by repeating the process of Comparative Example 1 two intermediate transfer members, Example I and Example I(A) except that 4.7 and 13 weight percent, respectively, of zirconium tungstate, average particle diameter of 200 nanometers as measured by an electron microscope, were added to the Comparative Example 1 coating composition.

The obtained intermediate transfer member coating dispersions or mixtures were individually coated on a stainless steel substrate of a thickness of 0.5 millimeter, and subsequently, the mixtures were cured by heating at 135° C. for 30 minutes, and 200° C. for 40 minutes. The resulting intermediate transfer member films comprised of the above ingredients of PPSU (RADEL® R-5000NT), special carbon black 4, zirconium tungstate and the polysiloxane copolymer (BYK® 333) with an Example I weight ratio of 80.9/4.71142/0.2 and an Example I(A) weight ratio 73.9/13/13/0.1 immediately self released, within about two seconds, from the stainless steel substrate without the assistance of any external processes.

EXAMPLE II

There is prepared a number of intermediate transfer members by repeating the process of Example I and Example I(A) except that there is selected in place of the PPSU the thermoplastic polymers of UDEL® P-1700 (a polysulfone), or VERADEL® 3000P (a polyethersulfone). It is believed that the intermediate transfer member films that result will self release in about 5 to 7 seconds from the stainless steel substrates.

Measurements

The above intermediate transfer members (ITM) of Comparative Example 1 and Example I were measured for Young's modulus, break strength, resistivity, and coefficient of thermal expansion (CTE). The measurement results are provided in the following Table 1.

The Young's modulus and break strength were measured by following the known ASTM D882-97 process where samples (0.5 inch×12 inch) of each intermediate transfer member were placed in the Instron Tensile Tester measurement apparatus, and then the samples were elongated at a constant pull rate until breaking. During this time, there was recorded the resulting load versus the sample elongation. The Young's Modulus was calculated by taking any point tangential to the initial linear portion of the recorded curve results and dividing the tensile stress by the corresponding strain. The tensile stress was calculated by the load divided by the average cross sectional area of each of the test samples. The break strength was recorded as the tensile stress when the sample broke or came apart. The results are provided in Table 1.

The surface resistivity of the above intermediate transfer members of Comparative Example 1 and Example I were measured using a High Resistivity Meter, and the results are provided in Table 1.

The CTE of the above intermediate transfer members of Comparative Example 1 and Example I were measured using a Thermo-mechanical Analyzer (TMA). Samples were cut using a razor blade and metal die to 4 millimeter wide pieces which were then mounted between the TMA clamp using 8 millimeter spacing. The samples were individually preloaded with a force of 0.05 N. The CTE values were obtained as a linear fit through the data between about −20° C. to about 50° C. using the TMA software.

TABLE 1

| Intermediate Transfer Member | Young's Modulus (MPa) | Break Strength (MPa) | Surface Resistivity (ohm/sq) | CTE (ppm/° K) |
|---|---|---|---|---|
| Comparative Example 1 | 3,500 | 75 | $6.2 \times 10^{10}$ | 100 |
| Example I | 3,600 | 79 | $4.2 \times 10^9$ | 91 |
| Example I (A) | 3,700 | 83 | $2.1 \times 10^9$ | 60 |

The above table results illustrate for example, that the resistivity of the Example I and Example I(A) samples were reduced versus the Comparative Example 1 sample.

The CTE value was reduced by about 10 percent for the Example I member comprising 4.7 weight percent of zirconium tungstate; and by 40 percent for the Example I(A) member comprising 13 weight percent of zirconium tungstate.

After being released from the stainless steel substrate, the Example I and Example I(A) films obtained can be used as intermediate transfer members. Also, the Example I and Example I(A) films obtained can be laminated or deposited on respective supporting substrates of a polymer like a polyimide.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member consisting of a single layer comprising a mixture of a conductive filler, a polysiloxane, a thermoplastic polymer wherein said thermoplastic polymer is selected from the group consisting of a polysulfone, a polyethersulfone, a polyester, a polycarbonate, a poly(phenylene sulfide), a polyamide, and mixtures thereof, and a zirconium tungstate wherein said zirconium tungstate is present in an amount of from about 5 to about 15 weight percent based on the total of ingredients present in the mixture, and an optional polymer.

2. The intermediate transfer member in accordance with claim 1 wherein said zirconium tungstate is present in an amount of from about 4.7 weight percent to about 13 weight percent and said conductive filler is carbon black.

3. The intermediate transfer member in accordance with claim 1 wherein said thermoplastic polymer is a polyphenylsulfone.

4. The intermediate transfer member in accordance with claim 1 wherein said thermoplastic polymer is a polyphenylsulfone as represented by the following formulas/structures

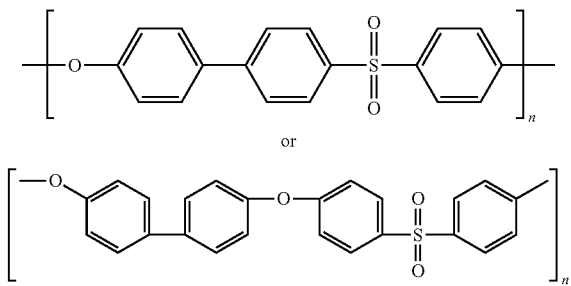

or wherein n represents the number of repeating segments of from about 30 to about 5,000.

5. The intermediate transfer member in accordance with claim 4 wherein n is from about 200 to about 2,000.

6. The intermediate transfer member in accordance with claim 1 wherein said thermoplastic polymer is a polyester selected from the group consisting of a polyethylene terephthalate, a polybutylene terephthalate, a polytrimethylene terephthalate, and a polyethylene naphthalate, or a polycarbonate selected from the group consisting of a poly(4,4'-isopropylidene-diphenylene)carbonate, a poly(4,4'-cyclohexylidine diphenylene)carbonate, and a poly(4,4'-isopropylidene-3,3'-dimethyl-carbonate.

7. The intermediate transfer member in accordance with claim 1 wherein said zirconium tungstate is represented by $Zr_zW_xO_y$, wherein x is from about 1 to about 4, y is from about 6 to about 10, and z is from about 0.5 to about 1.5.

8. The intermediate transfer member in accordance with claim 7 wherein said zirconium tungstate is present in an amount of about 5 weight percent based on the total of the ingredients present in the mixture.

9. The intermediate transfer member in accordance with claim 1 wherein said zirconium tungstate is represented by $ZrW_2O_8$.

10. The intermediate transfer member in accordance with claim 9 wherein said zirconium tungstate is present in an amount of from about 5 to about 13 weight percent based on the total of ingredients present in the mixture.

11. The intermediate transfer member in accordance with claim 1 wherein said thermoplastic polymer is present in an amount of from about 50 to about 95 weight percent based on the total of ingredients present in the mixture.

12. The intermediate transfer member in accordance with claim 1 wherein said thermoplastic polymer is present in an amount of from about 70 to about 90 weight percent based on the total of ingredients present in the mixture being about 100 percent.

13. The intermediate transfer member in accordance with claim 1 wherein for each ingredient of the mixture the thermoplastic polymer is present in an amount of from about 70 to about 95 weight percent, the zirconium tungstate is present in an amount of from about 4.7 to 13 weight percent, the polysiloxane is present in an amount of from about 0.05 to about 1 weight percent, and the conductive filler component is present in an amount of from about 3 to about 30 weight percent based on the total of ingredients present in the mixture.

14. The intermediate transfer member in accordance with claim 1 wherein the polysiloxane is a copolymer of a polyether and a polydimethylsiloxane, a copolymer of a polyester and a polydimethylsiloxane, a copolymer of a polyacrylate and a polydimethylsiloxane, or a copolymer of a polyester polyether and a polydimethylsiloxane.

15. The intermediate transfer member in accordance with claim 1 wherein the member has a coefficient of thermal expansion of from about 75 to about 95ppm/° k, and wherein the conductive filler is carbon black.

16. An intermediate transfer member in accordance with claim 1 wherein said optional polymer is present in said single layer mixture and is selected from the group consisting of a polyamideimide, a polyimide, a polyetherimide, a poly(vinylidene fluoride), a polyethylene-co-polytetrafluoroethylene, and mixtures thereof wherein the zirconium tungstate is present in an amount of about 5 weight percent or about 13 weight percent, the young Modulus thereof is about 3,600 MPa, the break strength is about 79 MPa, the CTE is about 91, and the surface resistivity is about $4.2 \times 10^9$ ohm/square.

17. The intermediate transfer member consisting of a single layer comprising a mixture of a thermoplastic polymer, wherein said thermoplastic polymer is selected from the group consisting of a polysulfone, a polyethersulfone, a polyester, a polycarbonate, a poly(phenylene sulfide), a polyamide, and mixtures thereof, a zirconium tungstate present in an amount of from about 5 to about 13 weight percent based on the total of ingredients present in the mixture, a single conductive filler of carbon black, and a polysiloxane, and wherein the intermediate transfer member possesses a coefficient of thermal expansion of from about 60 to about 95 ppm/° K.

18. The intermediate transfer member in accordance with claim 17 wherein said thermoplastic polymer is a polyphenylsulfone, and wherein said zirconium tungstate present in an amount of about 4.7 weight percent or about 13 weight percent is represented by $Zr_zW_xO_y$, wherein x is from about 1 to about 4, y is from about 6 to about 10, and z is from about 0.5 to about 1.5.

19. An intermediate transfer member wherein the intermediate transfer member transfers a xerographic toner developed image from a photoconductor to an image receiving substrate, and which member includes wherein said thermoplastic polymer is selected from the group consisting of a polysulfone, a polyethersulfone, a polyester, a polycarbonate, a poly(phenylene sulfide), a polyamide, and mixtures thereof, mixture of a thermoplastic polymer, in the form of a single layer, a zirconium tungstate present in an amount of from about 5 to about 15 weight percent based on the total of ingredients present in the mixture, and wherein said zirconium tungstate is represented by $Zr_zW_xO_y$, wherein x is from about 1 to about 4, y is from about 6 to about 10, and z is from about 0.5 to about 1.5, a single conductive filler of carbon black, and a polysiloxane, and which member possesses a coefficient of thermal expansion of from about 60 to about 95 ppm/° K.

* * * * *